US008397029B2

(12) United States Patent
Nicholas et al.

(10) Patent No.: US 8,397,029 B2
(45) Date of Patent: Mar. 12, 2013

(54) SYSTEM AND METHOD FOR CACHE COHERENCY IN A MULTIPROCESSOR SYSTEM

(75) Inventors: Richard Nicholas, Round Rock, TX (US); Jason Alan Cox, Raleigh, NC (US); Robert John Dorsey, Durham, NC (US); Hien Minh Le, Cedar Park, TX (US); Eric Francis Robinson, Raleigh, NC (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 11/959,793

(22) Filed: Dec. 19, 2007

(65) Prior Publication Data

US 2009/0164735 A1   Jun. 25, 2009

(51) Int. Cl.
 *G06F 12/00* (2006.01)
(52) U.S. Cl. ........ 711/141; 711/118; 711/119; 711/122; 711/124; 711/144; 711/145; 711/146; 711/154
(58) Field of Classification Search .................. 711/118, 711/119, 122, 124, 141, 144–146, 154
See application file for complete search history.

(56) References Cited

U.S. PATENT DOCUMENTS

| | | | | |
|---|---|---|---|---|
| 5,758,120 | A * | 5/1998 | Kahle et al. | 711/150 |
| 6,247,098 | B1 * | 6/2001 | Arimilli et al. | 711/141 |
| 6,272,603 | B1 * | 8/2001 | Arimilli et al. | 711/146 |
| 6,385,695 | B1 | 5/2002 | Arimilli et al. | |
| 6,460,114 | B1 | 10/2002 | Jeddeloh | |
| 6,970,976 | B1 | 11/2005 | Arimilli et al. | |
| 7,076,609 | B2 | 7/2006 | Garg et al. | |
| 7,085,897 | B2 * | 8/2006 | Blake et al. | 711/144 |
| 2006/0123206 | A1 | 6/2006 | Barrett et al. | |
| 2006/0179235 | A1 | 8/2006 | Bell, Jr. et al. | |
| 2006/0179243 | A1 * | 8/2006 | Fields et al. | 711/141 |
| 2006/0179250 | A1 * | 8/2006 | Guthrie et al. | 711/143 |
| 2006/0184742 | A1 | 8/2006 | Clark et al. | |
| 2006/0184743 | A1 | 8/2006 | Guthrie et al. | |
| 2006/0230252 | A1 | 10/2006 | Dombrowski et al. | |

(Continued)

OTHER PUBLICATIONS

Speight, Evan et al., Adaptive Mechanisms and Policies for Managing Cache Hierarchies in Chip Multiprocessors, International Conference on Computer Architecture; Proceedings of the 32nd Annual International Symposium on Computer Architecture, 2005, pp. 346-356.

(Continued)

*Primary Examiner* — Arpan P. Savla
(74) *Attorney, Agent, or Firm* — Patrick E. Caldwell, Esq.; The Caldwell Firm, LLC (57) ABSTRACT

A method for maintaining cache coherency operates in a data processing system with a system memory and a plurality of processing units (PUs), each PU having a cache, and each PU coupled to at least another one of the plurality of PUs. A first PU receives a first data block for storage in a first cache of the first PU. The first PU stores the first data block in the first cache. The first PU assigns a first coherency state and a first tag to the first data block, wherein the first coherency state is one of a plurality of coherency states that indicate whether the first PU has accessed the first data block. The plurality of coherency states further indicate whether, in the event the first PU has not accessed the first data block, the first PU received the first data block from a neighboring PU.

20 Claims, 3 Drawing Sheets

U.S. PATENT DOCUMENTS

2006/0236037 A1    10/2006    Guthrie et al.

OTHER PUBLICATIONS

Zhang, Michael et al., Victim Replication: Maximizing Capacity while Hiding Wire Delay in Tiled Chip Multiprocessors, International Conference on Computer Architecture; Proceedings of the 32nd Annual International Symposium on Computer Architecture, 2005, pp. 336-345.

Memik, Gokhan et al., Reducing energy and delay using efficient victim caches, International Symposium on Low Power Electronics and Design; Proceedings of the 2003 international symposium on Low power electronics and design; Seoul, Korea; Session: Power efficient cache design, 2003, pp. 262-265.

Allu, Bramha et al., Exploiting the replication cache to improve performance for multiple-issue microprocessors, ACM SIGARCH Computer Architecture News archive; vol. 33, Issue 3 Special issue: MEDEA 2004 workshop; col. Regular contributions, 2005, pp. 63-71.

Naz, Afrin et al., Making a case for split data caches for embedded applications, Memory Performance: Dealing With Applications, Systems and Architecture; Proceedings of the 2005 workshop on Memory performance: Dealing with Applications, systems and architecture; Saint Louis, Missouri; Special Issue: MEDEA'05, 2006, pp. 19-26.

Dybdahl, Haakon et al., An LRU-based replacement algorithm augmented with frequency of access in shared chip-multiprocessor caches, Memory Performance: Dealing With Applications, Systems and Architecture, Proceedings of the 2005 workshop on Memory performance: Dealing with Applications, 2006, pp. 45-52.

Temam, Olivier, Investigating optimal local memory performance, Architectural Support for Programming Languages and Operating Systems; Proceedings of the eighth international conference on Architectural support for programming languages and operating systems; San Jose, California, United States, 1998, pp. 218-227.

* cited by examiner

SYSTEM AND METHOD FOR CACHE COHERENCY IN A MULTIPROCESSOR SYSTEM

TECHNICAL FIELD

The present invention relates generally to the field of computer networking and parallel processing and, more particularly, to a system and method for improved cache coherency in a multiprocessor system.

BACKGROUND OF THE INVENTION

Modern electronic devices often include multiple processors, each sometimes referred to as a processing unit (PU), that each include core logic (a "core"), a level one (L1) cache, and a level 2 (L2) cache. Typically, each core can access only its own dedicated L2 cache, and cannot normally access the L2 cache of a nearby PU.

One skilled in the art will understand that there are many scenarios in which a core does not use its dedicated L2 cache to the maximum extent possible. For example, this may occur when a core executes code that uses the L2 cache only slightly or code from locked cache ways, when a core is powered down or in sleep mode, or when a core has been disabled, as, for example, in response to a detected manufacturing defect. These examples are but a sample of the many common scenarios in which a core underutilizes its dedicated L2 cache.

In light of this underutilization, there have been several attempts to improve cache performance, including some systems wherein one or more PUs share certain levels of their caches with each other. Each of the current approaches suffers from one or more disadvantages. Generally, one set of solutions focuses on castout handling, wherein the PU selects a cache line to "cast out" of its cache, ordinarily in order to make room for an incoming cache block that will be stored in the cache location currently occupied by the cache line selected for castout.

For example, one simple solution is to evict or "cast out" all cache lines to memory. That is, the simplest solution is to write back castout cache lines to memory when they are cast out. The castout lines can subsequently be retrieved over a common coherent bus, to which all L2 caches (and their associated PUs) are attached. However, this approach suffers from the obvious drawback that casting out all lines all the way to memory is inefficient and hinders performance. Further, this method does not enable one core to share another core's cache when that cache is underutilized. Additionally, this approach does not allow a cache to be employed when its core is powered down in sleep mode or has been deactivated because of a core manufacturing defect.

Another conventional approach provides a dedicated victim cache for each L2 cache. In this approach, evicted lines are cast out to the victim cache, and the victim cache is typically configured to hold only cache lines evicted from the L2 cache on a cache miss. This approach, however, adds an extra cache and supporting hardware, which consumes a greater area and power than the L2 cache by itself. Additionally, typical victim caches ordinarily allot space for only one or two lines per congruence class, compared to the six to eight lines in a standard cache, which therefore provides only a limited solution.

In another approach, hereinafter referred to as the Former approach, the PUs couple to a common L3 cache, and the L3 cache preselects one of three neighboring L2 caches to serve as a makeshift victim cache. Once the L3 cache selects the victim cache, the L3 cache and victim cache perform a request/grant handshake via a private communication, followed by a data-only transfer on a data bus coupling the L3 and L2 caches.

The Former approach suffers from the disadvantage that it lacks a mechanism to track whether a cache line has been previously moved. As such, evicted lines in the Former system can circulate from cache to cache indefinitely, which can cause unnecessary bandwidth costs and hamper system performance. Further, the Former victim cache, the castout target cache, must accept the incoming cache line, which can require the victim cache to evict a cache line that it otherwise would have kept in the cache. As such, the Former approach can enhance the performance of one cache at the expense of another.

In another approach, hereinafter referred to as the Garg approach, illustrated by U.S. Pat. No. 7,076,609, the cores share two L2 caches, splitting the associativity across the L2 caches equally. The PUs share combined replacement controls, such as, for example, for L2 miss detection and handling. Specifically, the Garg approach allocates a new line, retrieved from memory in response to an L2 cache miss, into either of the L2s, depending on the replacement policy at that time. Further, the Garg approach searches both L2 caches simultaneously in response to an L1 miss.

As such, the Garg approach provides a shared, multi-bank level 2 cache, with a wide associativity. The Garg approach therefore also suffers from the disadvantages of a single shared cache. Specifically, Garg line replacement methods must search multiple L2 caches, which increases search time. Further, because the associativity in Garg extends across L2 caches, each Garg L2 cache must be searched whenever any one L2 cache must be searched, not only in the event of a local L2 cache miss. Additionally, because no Garg cache contains all the associativity for a particular congruence class, a cache replacement placed in one L2 cache will still miss in a local L2 not containing the cache line, which would ordinarily hit in a conventional system.

Therefore, there is a need for a system and/or method for cache coherency in a multiprocessor system that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

It is, therefore, one aspect of the present invention to provide for an improved cache coherency method.

It is a further aspect of the present invention to provide for an improved cache coherency system.

It is a further aspect of the present invention to provide for an improved system for cache coherency in a multiprocessor system.

It is a further aspect of the present invention to provide for an improved method for cache coherency in a multiprocessor system.

The aforementioned aspects and other objectives and advantages can now be achieved as described herein. A method for maintaining cache coherency operates in a data processing system with a system memory and a plurality of processing units (PUs), each PU having a cache, and each PU coupled to at least another one of the plurality of PUs. A first PU receives a first data block for storage in a first cache of the first PU. The first PU stores the first data block in the first cache. The first PU assigns a first coherency state and a first tag to the first data block, wherein the first coherency state is one of a plurality of coherency states that indicate whether the first PU has accessed the first data block. The plurality of coherency states further indicate whether, in the event the first PU has not accessed the first data block, the first PU received the first data block from a neighboring PU.

In an alternate embodiment, a system comprises a system memory and a plurality of processing units (PUs) coupled to the system memory, each PU further coupled to at least one other of the plurality of PUs, wherein each PU comprises a cache. Each PU is configured to receive a first data block for storage in a first cache of the first PU and store the first data block in the first cache; each PU assigns a first coherency state and a first tag to the first data block. The first coherency state is one of a plurality of coherency states that indicate whether the first PU has accessed the first data block and, in the event the first PU has not accessed the first data block, whether the first PU received the first data block from a neighboring PU.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

The invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus or otherwise tangible medium that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 1:
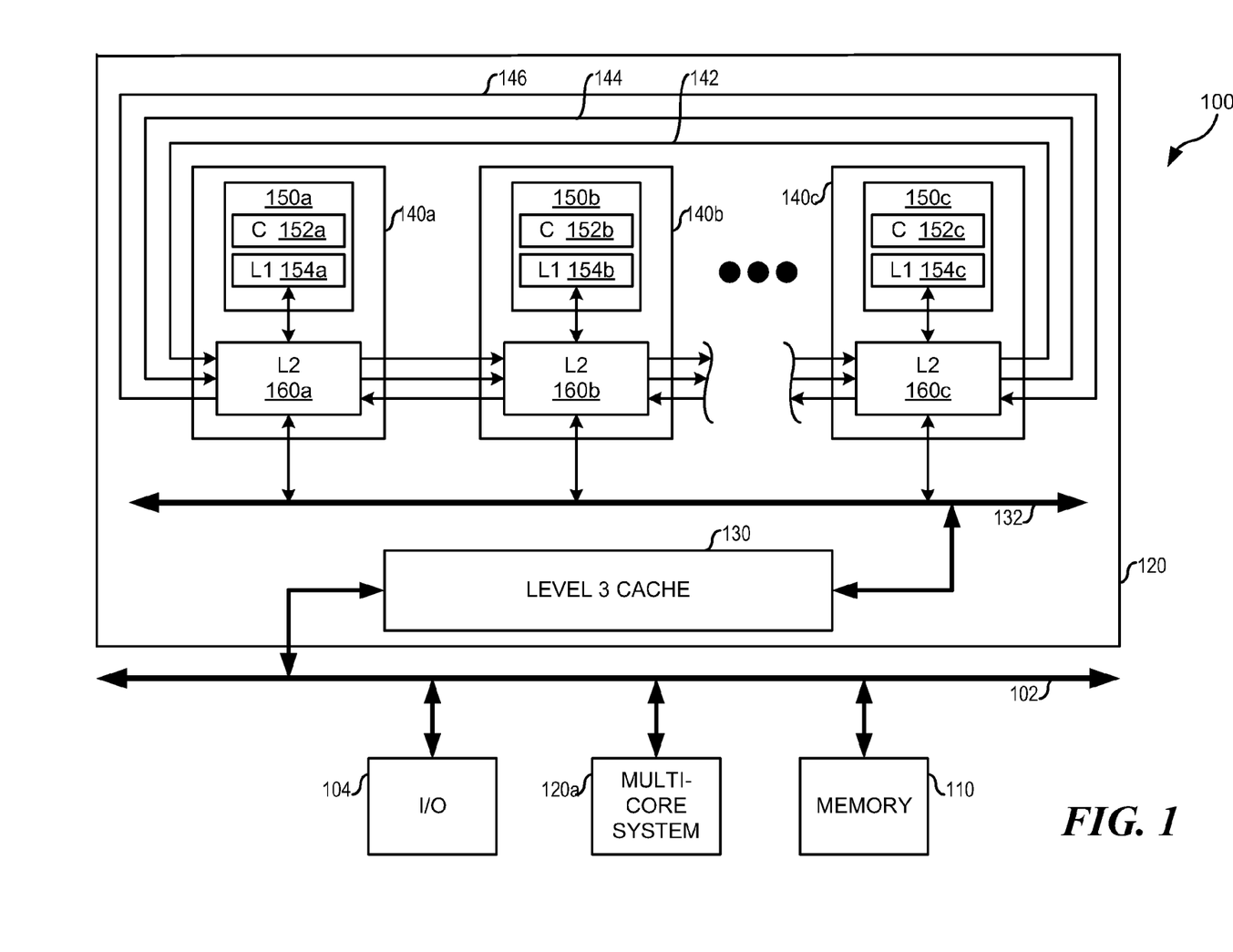
FIG. 1 illustrates a block diagram showing a computer system in accordance with a preferred embodiment.

Referring now to the drawings, FIG. 1 is a high-level block diagram illustrating certain components of a system 100 for improved cache coherency, in accordance with a preferred embodiment of the present invention. System 100 comprises a system bus 102.

Generally, system bus 102 is an otherwise conventional computer system bus, modified as described below, to which the various components of system 100 couple. More specifically, computer system 100 includes an input/output (I/O) system 104. I/O system 104 couples to system bus 102 and is an otherwise conventional I/O system, including software and hardware to provide an interface between system 100 and, for example, a user, another computer system, the Internet, or other suitable external entity. Generally, I/O system 104 is the collection of common components and software that make up an input/output system for a modern computer system, not otherwise described herein, as one skilled in the art will understand.

System 100 also includes memory 110. Memory 110 couples to system bus 102 and is an otherwise conventional computer system memory. System 100 also includes one or more multi-core systems (MCS) 120. Generally, as described in more detail below, each MCS 120 is a processor or plurality of processors, including caches and other support hardware, configured to perform typical computer tasks, in accordance with one or more preferred embodiments described herein. In the illustrated embodiment, system 100 includes two MCSs, MCS 120 and MCS 120a. In an alternate embodiment, one MSC 120 can be replaced with a conventional processing unit (PU). One skilled in the art will understand that system 100 can also be configured with more than two MCSs 120, one or more of which can be replaced with a conventional PU. In the illustrated embodiment, MCS 120a represents these various options collectively. Generally, MCS 120 and MCS 120a receive and process data for system 100.

Generally, in the illustrated embodiment, MCS 120 couples to the other components of system 100 through a level 3 (L3) cache 130 coupled to system bus 102. L3 cache 130 is an otherwise conventional L3 cache, modified as described herein, and contains instructions and/or data for processing units (PUs) of MCS 120. L3 cache 130 also couples to a secondary bus 132. Secondary bus 132 is contained entirely within MCS 120, and is an otherwise conventional computer system bus.

MCS 120 includes a plurality of processing units (PUs) 140 that couple to one or more other PUs and to secondary bus 132. In the illustrated embodiment, MCS 120 includes three exemplary PUs 140, PU 140a, PU 140b, and PU 140c, each of which couple to secondary bus 132. Generally, each PU 140 is configured to communicate with L3 cache 130 through secondary bus 132. Further, each PU 140 generally receives data and instructions for processing, processes the received data and instructions, and returns results to one or more other components of system 100.

Each PU 140 couples to one or more other PUs through a plurality of communication channels. FIG. 1 illustrates three such communication channels in an exemplary embodiment. Specifically, each PU 140 in system 100 couples to a downstream PU through an interconnect link 142 and link 144. Similarly, each PU 140 in system 100 couples to an upstream PU through an interconnect link 146. As used herein, "each" means all of a particular subset. Links 142, 144, and 146 are otherwise conventional communication channels, interconnects, or other connection suitable to couple the PUs to each other for data/instruction transfer, control communications, or other suitable operations.

As used herein, the terms "upstream" and "downstream" refer to the PUs in relation to each other, whether organized into a ring, star, or other topology. That is, a target PU receives cast-in cache lines, described in more detail below, from an "upstream" neighboring PU. Similarly, a PU casts out cache lines to a neighboring "downstream" PU. As used herein, a "neighboring PU" is a PU coupled to another PU so as to exchange control information, data, and instructions with the other PU.

Each PU 140 includes a core 150, shown as 150a, 150b, and 150c. Each core 150 includes core logic 152, shown as 152a, 152b, and 152c. Core logic 152 is an otherwise conventional core logic, modified as described herein. Each core logic 152 couples to a dedicated level 1 (L1) cache 154, shown as 154a, 154b, and 154c. L1 cache 154 is an otherwise conventional L1 cache, modified as described herein.

Each core 150 couples to a dedicated level 2 (L2) cache 160, shown as 160a, 160b, and 160c. L2 cache 160 is an otherwise conventional L2 cache, modified as described herein. As described in more detail below, each PU 140 is configured to initiate a cast out of certain cache lines, under certain circumstances, from its own L2 cache 160 to a neighboring PU's L2 cache 160.

For example, in one embodiment, PU 140a casts out a cache line from its L2 cache 160a to downstream PU 140b's L2 cache 160b. L2 cache 160b receives the cache line as a "cast-in" cache line. Similarly, in one embodiment, PU 140c casts out a cache line from its L2 cache 160c to downstream PU 140a's L2 cache 160a. L2 cache 160a receives the cache line as a "cast-in" cache line. Thus, the PUs 140 of MCS 120 are generally configured to cast out cache lines to a neighboring PU's L2 cache, under certain circumstances described in more detail below.

Additionally, exemplary system 100 illustrates the features of the cast-out/cast-in operations described herein with respect to L2-to-L2 transactions. One skilled in the art will understand that the principles of the embodiments disclosed herein can also be applied to operate in L3-to-L3 transactions, L1-to-L1 transactions, and other suitable configurations, with the benefit of the teachings herein. One skilled in the art will also appreciate the need for some mechanism to maintain coherency among the various levels of the cache hierarchy.

While there are a number of modern protocols and techniques for achieving cache coherence, most typical protocols allow only one processor permission to write to a given memory location, as a cache block, at any particular point in time. As such, whenever a PU wishes to write to a memory location, there must be some mechanism to verify with all of the other PUs that the pending write operation is acceptable under the coherency protocol. In one embodiment, the PUs attempt this verification through a "snoop" protocol.

As described above, in one embodiment, the PUs in a multi-core system couple together over a secondary bus (for example, secondary bus 132 of FIG. 1). The PUs communicate over the secondary bus for coherency and other purposes, including, for example, indicating a desire to read from or write to memory locations. When a PU indicates a pending operation on the secondary bus, all the other PUs monitor (or "snoop") the pending operation. The snooping PUs compare the target memory location in the pending operation to the stored memory locations in their respective caches, determining whether the cache states can allow the pending operation and, if so, under what conditions.

In typical modern protocols, and in embodiments of the present invention herein, there are several bus memory transactions that require snooping and follow-up action, as one skilled in the art will understand. A "read with intent to write" for example, requires snooping and follow-up action. Additionally, in some embodiments, there are additional hardware and signaling lines required to support the snoop operations, which are omitted here for clarity.

Thus, generally, in order to maintain cache coherence, whenever a PU wishes to read or write a memory block, it must indicate that desire to the other PUs in the system. The cache coherence protocol therefore includes a status indicator indicating the current coherency "state" of the block, with each cache block in each level having its own state. For example, if only one PU has an active copy of a cache block, that PU marks the block as being in a coherency state of "exclusive," subject to additional protocol requirements described in more detail below. Generally, PUs can write to an exclusive cache block without first communicating with other PUs in the system because no other processing unit has a copy of that cache block.

Additionally, in some instances, PUs can retrieve requested cache blocks directly from neighboring PUs, instead of from main memory, in an "intervention" operation. As such, the source PU can transfer the requested cache block to the requesting PU without causing coherency problems, and without first writing the cache block to memory.

Figure 2:
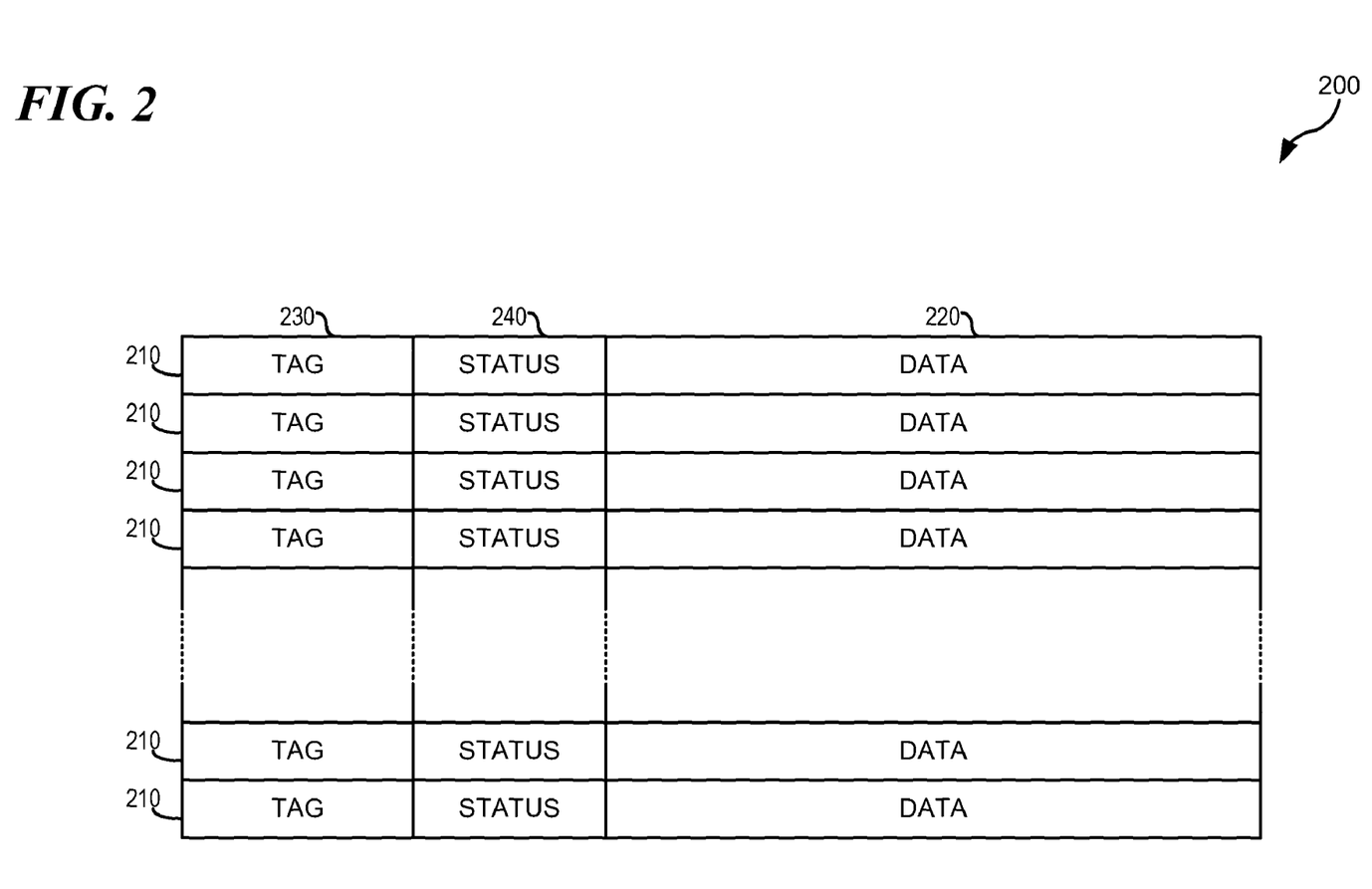
FIG. 2 illustrates a block diagram showing a cache directory in accordance with a preferred embodiment.

To support intervention and other state-based operations, there must be some mechanism to associate a coherency state with a particular cache block. More particularly, one skilled in the art will understand that, generally, many modern computer system caches are organized as indexed rows and/or columns of data. Referring now to FIG. 2, an otherwise conventional cache 200 includes a plurality of cache lines 210. Each cache line 210 is an otherwise conventional cache line or cache block. Each cache line 210 includes data 220, a tag 230, and a status 240. As illustrated, cache 200 is a direct mapped cache. However, one skilled in the art will understand that cache 200 can also be configured as an n-way set associative cache, or a fully associative cache.

However configured, each cache line 210 of cache 200 includes a tag 230 that identifies the particular memory location associated with the data 220. Additionally, each cache line 210 includes a status 240. In one embodiment, status 240 comprises a plurality of bits configured to indicate one of a plurality of valid coherency states for the cache line.

Generally, as used herein, a "coherency state" refers to one of a plurality of states representing the relationship between data stored in a cache and data stored in memory and in other caches. To reduce confusion, the discussion herein refers to cache lines or cache blocks as being "in a coherency state of X" or "in coherency state X," where X indicates a coherency state associated with the cache line/block. This serves to distinguish an invalid coherency state (a coherency state not defined by the coherency protocol), from an invalid cache line (a cache line with invalid data). For example, a "coherency state of Shared(moved)" is an invalid coherency state in the coherency protocol described herein, whereas a "coherency state of invalid" is a valid coherency state.

Figure 3:
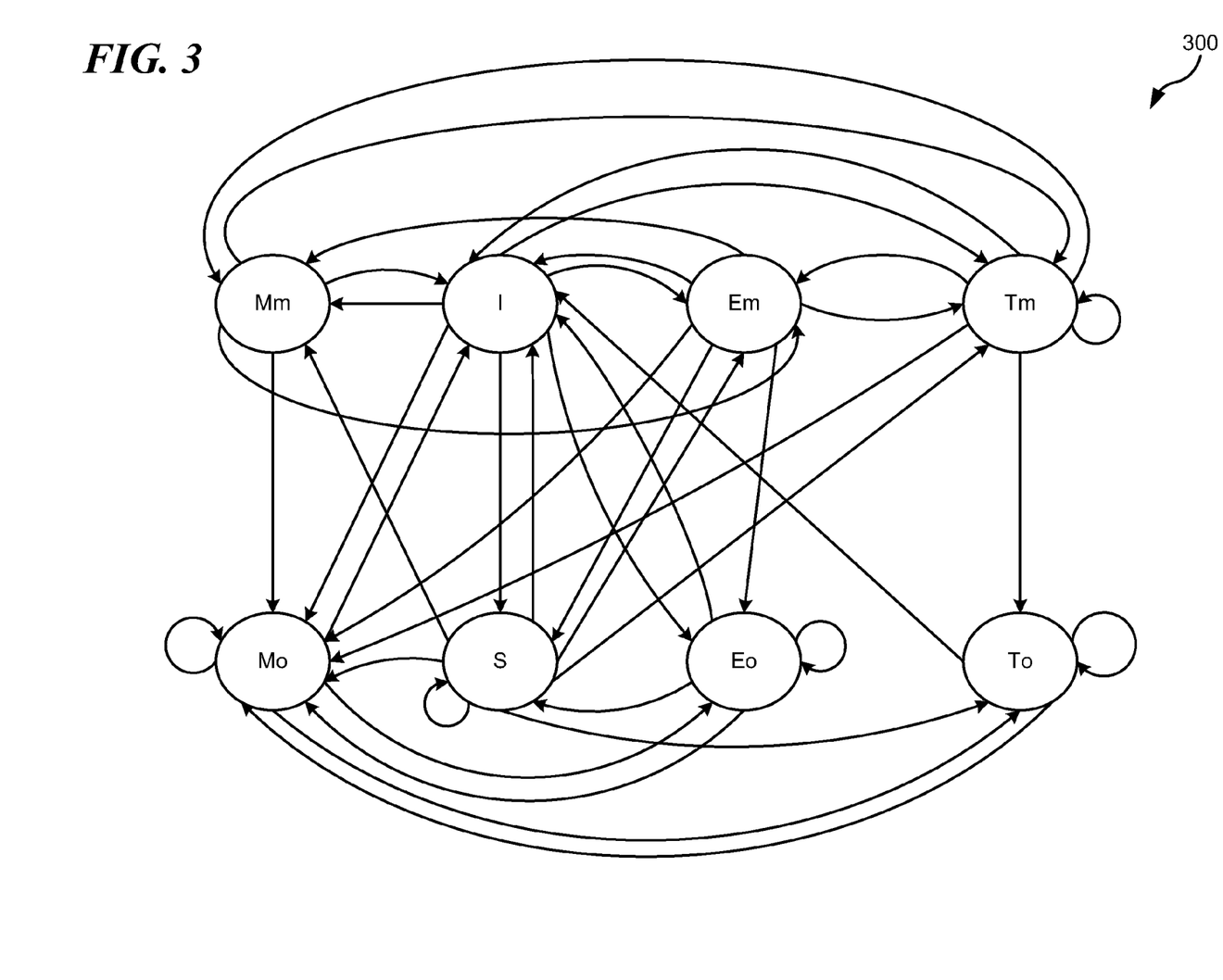
FIG. 3 illustrates a high-level state diagram depicting logical states of an improved cache coherency protocol, which can be implemented in accordance with a preferred embodiment.

FIG. 3 illustrates one embodiment of a plurality of valid coherency states in an improved cache coherency protocol. Specifically, FIG. 3 illustrates a high-level state diagram 300 depicting logical states of an improved cache coherency protocol, which can be implemented in accordance with a preferred embodiment. Generally, each cache line 210 of FIG. 2 includes a status 240, which indicates that the data 220 is in one of the coherency states described below, unless indicated otherwise.

Diagram 300 illustrates eight valid coherency states: Modified(moved) ("Mm"), Modified(owned) ("Mo"), Invalid ("I"), Shared ("S"), Exclusive(moved) ("Em"), Exclusive(owned) ("Eo"), Tagged(moved) ("Tm"), and Tagged(owned) ("To"). Generally, states Mm, Mo, I, S, Em, and Eo are configured as the well-known MESI protocol states "Moved," "Exclusive," "Shared," and "Invalid," except as modified herein.

Generally, state Mo indicates that the cache line is valid and contains modified data. Copies of this line do not and cannot exist in any other cache. The local PU has accessed this cache line. The local PU is the PU that includes the cache storing this cache line.

Generally, state Mm indicates that the cache line is valid and contains modified data. Copies of this line do not and cannot exist in any other cache. The local PU has not accessed this cache line. Further, this cache line was received by the local PU as a cast-in cache line, from a neighboring PU that cast out the cache line.

Generally, state Eo indicates that the cache line is valid and contains unmodified data, that is, the data matches data stored in memory. Copies of this line do not and cannot exist in any other cache. The local PU has accessed this cache line.

Generally, state Em indicates that the cache line is valid and contains unmodified data. Copies of this line do not and cannot exist in any other cache. The local PU has not accessed this cache line. Further, this cache line was received by the local PU as a cast-in cache line, from a neighboring PU that cast out the cache line.

Generally, state S indicates that the cache line is valid and copies of this line may exist in other caches. In the illustrated embodiment, state S indicates only that the cache line is valid and that other copies may exist. In an alternate embodiment, state S includes a sub-state, Shared(last) ("S(I)") indicating that the cache line is the most-recently accessed of the copies of the cache line. The S(I) state facilitates data intervention of lines in the "shared" state.

Generally, state I indicates that the cache line is not valid in the current cache. Copies of the cache line may exist in other caches, in various other states.

Generally, state To indicates that the cache line is valid and contains modified data. A PU has sent at least one copy of this cache line to another PU's cache though an intervention operation. The local PU has accessed this cache line. One skilled in the art will recognize that state To is an extension to the well-known MESI cache coherency protocol. Generally, a "tagged" state indicates that the PU holding the tagged cache line is responsible for writing the modified cache line back to the memory hierarchy at some time in the future. The PU holding the tagged cache line can satisfy its responsibility by writing back to system memory or by passing the tag to another PU.

Generally, state Tm indicates that the cache line is valid and contains modified data. A PU has sent at least one copy of this cache line to another PU's cache though an intervention operation. Further, this cache line was received by the local PU as a cast-in cache line, from a neighboring PU that cast out the cache line. The local PU has not accessed this cache line.

One skilled in the art will understand that the coherency state of a cache block changes over time, as the cache block experiences various operations and status changes resulting from cache and memory operations. For example, the "moved" sub-state, shown in states Mm, Em, and Tm, indicates whether the local PU received the cache line from a neighboring PU or from main memory. The "moved" sub-state also implies that the local PU has not accessed the cache line itself, as the PU would thereby transition the state to the corresponding "owned" sub-state. When a PU accesses a cache line in its L2 (or L1) cache, the PU changes the state to an appropriate "owned" state, as described in more detail below.

While the state diagram 300 indicates the complete protocol in one embodiment, certain state transitions can be configured in a variety of alternative embodiments. The following describes state diagram 300 in additional detail, with certain alternative embodiments.

Generally, empty cache lines are in coherency state I. Additionally, cache lines that no longer contain valid data transition to coherency state I, in an "invalidation" or "invalidate" operation. When a PU requests data from a memory location, and the cache line for that memory location does not contain the requested data, (a local load miss) the requesting PU queries neighboring PUs (and the system bus) to determine whether any other PU has the cache block containing the requested data.

If no other PU's cache has the requested data, and the cache line for the requested memory location is in coherency state I, the PU retrieves the data from memory (or the L3 cache), and transitions the cache line coherency state from I to Eo. That is, the PU is the only PU with the cache line, and that PU has accessed the cache line. In the case of a store miss, where the local PU wishes to write to a memory location not found in the local cache, the PU retrieves the data from memory (or the L3 cache), writes to the cache line, and transitions the cache line coherency state from I to Mo. That is, the PU is the only PU with the cache line, the cache line is modified from the memory copy, and the local PU has accessed the cache line.

If another PU's cache has the requested data, and the other PU's cache line is in state Mo or Mm, the local PU retrieves the data from the other PU, the local PU transitions the cache line coherency state of the local PU copy of the cache line from I to S, and the other PU (which provided the cache line) transitions the cache line coherency state of its copy of the cache line from Mo or Mm to To or Tm, respectively. In an alternate embodiment, if another PU's cache has the requested data, and the other PU's cache line is in state Eo, Em, To, Tm, or S, the local PU retrieves the data from the other PU, and transitions the cache line coherency state from I to S. If another PU's cache has the requested data, and the other PU's cache line is in state Mo or Mm, the PU retrieves the data from the other PU, and transitions the cache line coherency state from I to To, and the other PU (which provided the cache line) transitions the cache line coherency state of its copy of the cache line to S. As such, the local PU also assumes responsibility to write back the modified data, as described above.

Moreover, even after the local PU has the requested data, the cache line state can change again based on subsequent cache operations. For example, where the local PU has the cache line in coherency state Eo and modifies the cache line in a store operation, the local PU transitions the cache line state from Eo to Mo. In the event another PU requests the cache line, the local PU provides the requested cache line to the requesting PU, through an intervention operation, and transitions the coherency state of the cache line in the local PU's cache from Mo to To.

Where the local PU has the cache line in coherency state To, and another PU requests the cache line, the local PU provides the cache line to the requesting PU (through an intervention operation) and transitions the cache line state from To to To.

As described above, state To indicates that the local PU is responsible for writing back the modified (or "dirty") cache line to memory. If, however, the local PU wants to modify the cache line, in one embodiment, the local PU makes a bus request that causes all other PUs holding a copy of the cache line to invalidate their copy of the cache line. The local PU then transitions the coherency state of the local PU's copy of the cache line from To to Mo.

When the system writes the modifications back to memory, or otherwise "cleans" the "dirty" cache line, the local PU transitions the cache line state from Mo to Eo. When the local PU subsequently reads or writes the cache line, the local PU transitions the cache line state from Eo to Eo. Similarly, when the local PU holds the cache line in a coherency state of Mo, when the local PU subsequently reads the cache line, the local PU transitions the cache line state from Mo to Mo. In an alternate embodiment, the local PU does not modify cache line states that do not change during a transition. In an alternate embodiment, the local PU always transitions cache line states, even when the result is a transition from one state to the same state, as from To to To, S to S, Eo to Eo, or Mo to Mo for example.

Where the local PU has the cache line in coherency state Eo, and another PU requests the cache line, the local PU provides the cache line to the requesting PU and transitions the cache line state from Eo to S. Where the local PU has the cache line in coherency state S and modifies the cache line in a store operation, the local PU transitions the cache line state from S to Mo, and the local PU sends invalidation or ownership claims to the other PUs. Thus, other PUs that held the cache line would transition the coherency states of their copies of the cache line from, for example, S to I.

State diagram 300 illustrates a number of transitions unique to embodiments of the present invention. For example, one such unique transition occurs where the local PU has the cache line in coherency state S and another PU has the cache line in coherency state To. In the event the other PU wants to discard or otherwise invalidate its copy of the cache line, the local PU can assume ownership of the cache line by transitioning the coherency state of the cache line from S to To without requiring the other PU to perform a traditional castout. One skilled in the art will appreciate that the other PU need not transfer any data to the local PU, as the local PU already holds the cache line. Further, as the state S indicates that the local PU has already accessed the cache line previously, the local PU transitions the coherency state from S to To and not to Tm. One skilled in the art will understand that this transition (S to To) is not available in prior art MESI or MESI-T protocols.

Additionally, as described above, the coherency protocol described herein operates in a unique environment wherein the local PU can receive cast out cache lines from neighboring PUs. The neighboring PUs cast out such cache lines to make room for incoming replacement lines, among other reasons, and the local PU can receive such cache lines as "cast in" cache lines. Companion disclosures, filed concurrently herewith, describe this unique environment and the local PU's determination as to whether to accept cast in lines in additional detail.

The coherency protocol described herein includes several novel states configured to address the coherency issues involved in casting out cache lines to neighboring L2 caches. As described above, in one embodiment, state diagram 300 also illustrates the unique states Mm, Em, and Tm, generally describing cache lines that have been moved out of one PU's cache (cast out), and moved into the local PU's cache (cast in). For example, where the local PU accepts a cast in cache line into a cache location previously in a coherency state of I, the local PU stores the cast in cache line in the cache location, and transitions the coherency state of the cache line to Mm, EM, or Tm, depending on whether the cast in cache line came from the casting out PU in a coherency state of M(m or o), E(m or o), or T(m or o), respectively.

Where the local PU subsequently reads from or writes to a cache line in a coherency state of Mm, the local PU transitions the coherency state of the cache line from Mm to Mo. Similarly, where the local PU subsequently reads a cache line in a coherency state of Em, the local PU transitions the coherency state of the cache line from Em to Eo. Similarly, where the local PU subsequently reads a cache line in a coherency state of Tm, the local PU transitions the coherency state of the cache line from Tm to To. Thus, the sub-state of "owned" generally indicates whether the local PU has accessed the cache line.

Where the local PU has the cache line in coherency state Em, and another PU requests the cache line, the local PU provides the cache line to the requesting PU, through an intervention operation, and the local PU transitions the cache line state from Em to S. Similarly, where the local PU has the cache line in coherency state Mm, and another PU requests the cache line, the local PU provides the cache line to the requesting PU, through an intervention operation, and the local PU transitions the cache line state from Mm to Tm. Similarly, where the local PU has the cache line in coherency state Tm, and another PU requests the cache line, the local PU provides the cache line to the requesting PU, through an intervention operation, and the local PU transitions the cache line state from Tm to Tm.

Where the local PU has the cache line in coherency state Em, and the local PU writes to the cache line, the local PU transitions the cache line state from Em to Mo. Similarly, where the local PU has the cache line in coherency state Tm, and the local PU writes to the cache line, the local PU transitions the cache line state from Tm to Mo. The local PU also claims ownership of the cache line through an invalidation operation, which notifies the other PUs that the local PU has modified the data in the cache line.

Certain transitions of state diagram 300 refer to transitions from a first cache line in a first state to a second cache line in a second state, where the second cache line replaces the first cache line in that cache location. Such transitions are only shown for lines sent from one cache to another cache and are not shown for new line replacements within a single cache. For example, in one embodiment, where the local PU has the cache line in coherency state Mm, and another PU requests the cache line, the local PU provides the cache line to the requesting PU, through an intervention operation, and the local PU transitions the cache line state from Mm to Tm. In an alternate embodiment, where the local PU has the cache line in coherency state Mm, the local PU can replace the cache line with a cast-in cache line. If the cast-in cache line is in a coherency state of Tm, the local PU thereby transitions the coherency state of the cache line in that cache location from Mm (the replaced line's state) to Tm (the cast-in line's state). Accordingly, the transition from Mm to Tm can indicate either that the PU sourced the first cache line to another PU through an intervention, or that the PU replaced the first cache line with a second cache line, which happened to be in coherency state Tm.

Similarly, where the PU has a first cache line in a coherency state of S, and the PU has accepted a cast-in cache line that will replace the first cache line, the resultant state of the cache line in that cache location depends on the state of the cast-in cache line. As such, the local PU stores the cast-in cache line in the cache location vacated by the first cache line, and transitions the coherency state of the cache line from S to either Mm, Tm, or Em, accordingly. Similar replacement transitions can occur when the local PU replaces a first cache line in a coherency state of Mm, Tm, or Em, with a cast-in cache line in a coherency state of Mm, Tm, or Em, as one skilled in the art will understand.

In the illustrated embodiment, the local PU assigns a coherency state of "moved" to cast-in cache lines, even if the local PU received the cast-in cache line in a coherency state of "owned." That is, in one embodiment, the local PU assigns a local coherency state of, for example, Em, to a cast-in cache line received in a cast out coherency state of Eo. In an alternate embodiment, a local PU accepts a cast-in cache line and assigns a coherency state for the cache line based, in part, on whether the local PU has itself accessed the cache line.

Thus, generally, state diagram 300 illustrates a coherency protocol that provides significant technical advantages over prior art systems and method. For example, the disclosed coherency protocol illustrates that a local PU can replace a cache line held in the local PU's cache with a cast-in line from another PU. Generally, a local PU will accept lines from a neighbor PU if the local PU has an available cache line in a coherency state of I, S, or "moved." Likewise, a local PU will generally not replace its own cache lines with a cast-in cache line, if the local cache lines are in a coherency state of "owned." A local PU will replace local cache lines in a coherency state of Shared because there is a reasonable probability that another neighboring PU also holds the replaced cache line in coherency state S.

More generally, the novel coherency protocol described herein introduces cache coherency states Mo, Mm, Eo, Em To, and Tm. These novel coherency states are similar in some respects to the standard M, E, S, I, and T states, except that the M, E and T states have an additional attribute that distinguishes a cache line in those states as being either an "owned (o)" line or a "moved (m)" line. As described above, a local PU marks an M, E or T line as "owned" if the PU core attached to the L2 cache where the line resides has accessed the line, either originally or since the line arrived from a neighboring PU's L2 cache. Similarly, the local PU marks an M, E or T line as "moved" if the local PU received the cache line from a neighbor L2 cache, and the PU core attached to the L2 cache where the line resides has not accessed the line.

Accordingly, the disclosed embodiments provide numerous advantages over prior art methods and systems. For example, the disclosed coherency protocol expands the MESI and MESI-T cache coherency protocols, adding three "owned" states. Accordingly, the disclosed coherency protocol supports casting out lines from one PU cache into another PU cache, thereby improving cache retention in such a system. In particular, the disclosed embodiments can result in cache lines being kept in higher levels of the cache hierarchy longer, rather than being sent to higher latency memory.

In another technical advantage, the additional states also help the PUs to optimize both their replacement algorithms and the mechanism by which cache lines are accepted for cast-in. By distinguishing between cache lines that are "owned" and cache lines that have only been "moved" into a local PU cache, the local PU can provide supplemental cache space to a neighboring PU, without also sacrificing the local PU's performance.

In another technical advantage, distinguishing between "moved" and "owned" cache lines assists in preventing a cache line from passing from neighboring PU to neighboring PU to neighboring PU and so on. That is, in one embodiment, "moved" cache lines are not permitted to be cast out to a neighboring PU's cache. The PUs instead replace or invalidate lines that have not been "owned," thereby preventing unwanted cache lines from circulating indefinitely. This mechanism relieves the system caches from filling up with unwanted cache lines and helps prevent system performance degradation.

In another technical advantage, the new states assist the PUs in optimizing their cache line replacement algorithms. For example, in one embodiment, when a local PU replaces a cache line, whether to receive a cast-in line or to receive a locally requested line, the local PU will generally replace any "moved" lines before it replaces its own "owned" lines.

In still another technical advantage, the disclosed coherency protocol supports tagged cache line ownership transfer without requiring a costly, and redundant, data transfer. In particular, this aspect of the present invention advantageously avoids a line store to memory (needed when a tagged line is discarded under prior art protocols). Additionally, this aspect of the present invention also allows the cache line to remain in the tagged state in another cache. This aspect therefore provides even further advantage, in that a PU can provide a tagged line to a neighboring PU through intervention in situations where a shared line is often ineligible for intervention.

The disclosed coherency protocol also offers particular advantages over specific prior art systems and methods. For example, in contrast to the Former approach, the disclosed coherency protocol herein can move a tagged line to a neighboring PU cache in the shared state, with no data traffic required. Additionally, because the Former approach lacks the novel "moved" and "owned" states described herein, Former systems cannot employ such states to prevent endless circulation of old cache lines.

Additionally, Former PUs cannot refuse to accept cast out cache lines as cast-in cache lines. In the disclosed coherency protocol, a local PU can refuse to accept cast out cache lines until the local PU has sufficient room in the form of a cache line in a coherency state of invalid, shared, or one of the moved states. Thus, unlike the Former approach, the present invention does not improve one PU's cache performance at the cost of degrading another PU's cache performance.

Similarly, the present invention offers numerous advantages over the Garg approach. Because the present invention supports improved cache line cast out and retrieval protocols, such systems are improvements over the Garg approach, and the Garg approach suffers from the disadvantages of a single shared cache, including low scalability. Further, the disclosed coherency protocol supports reduced cache miss searching, as line replacement protocols in systems employing the present invention can restrict cache searches to the local L2 cache, instead of multiple L2 caches. As such, the present invention improves cache performance generally, over the Garg approach and other prior art systems and methods.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method for maintaining cache coherency in a data processing system with a system memory and a plurality of processing units (PUs), each PU having a cache, and each PU coupled to at least another one of the plurality of PUs, the method comprising:
   receiving, by a first PU, a first data block for storage in a first cache of the first PU;
   storing the first data block in the first cache;
   assigning a first coherency state and a first tag to the first data block;
   wherein the first coherency state is one of a plurality of coherency states that indicate whether the first PU has accessed the first data block; and
   wherein the plurality of coherency states further indicate whether, in the event the first PU has not accessed the first data block, the first PU received the first data block from a neighboring PU.

2. The method of claim 1, wherein the plurality of coherency states further indicate:
   whether the first data block contains modified data;
   whether the first data block is invalid; and
   whether any other PU of the plurality of PUs also has a copy of the first data block.

3. The method of claim 1, wherein the plurality of coherency states further indicate whether the first data block has been sent to at least one of the plurality of PUs by an intervention operation.

4. The method of claim 1, wherein the plurality of coherency states further indicate the first PU received the first data block from a second cache of a second PU.

5. The method of claim 1, further comprising assigning a second coherency state to the first data block.

6. The method of claim 5, wherein the first PU assigns the second coherency state based on snooping an interconnect coupling the first PU to at least one other of the plurality of PUs.

7. The method of claim 5, wherein the first PU assigns the second coherency state based on the first PU accessing the first data block.

8. The method of claim 1, wherein the plurality of PUs are coupled together in a ring structure.

9. The method of claim 1, wherein the plurality of PUs are coupled together in a star structure.

10. A processor comprising a computer program product for maintaining cache coherency in a data processing system with a system memory and a plurality of processing units (PUs), each PU having a cache, and each PU coupled to at least another one of the plurality of PUs, the computer program product having a tangible non-transitory computer-readable medium with a computer program embodied thereon, the computer program comprising:
    computer code for receiving, by a first PU, a first data block for storage in a first cache of the first PU;
    computer code for storing the first data block in the first cache;
    computer code for assigning a first coherency state and a first tag to the first data block;
    wherein the first coherency state is one of a plurality of coherency states that indicate whether the first PU has accessed the first data block; and
    wherein the plurality of coherency states further indicate whether, in the event the first PU has not accessed the first data block, the first PU received the first data block from a neighboring PU.

11. The processor of claim 10, wherein plurality of coherency states further indicate:
    whether the first data block contains modified data;
    whether the first data block is invalid; and
    whether any other PU of the plurality of PUs also has a copy of the first data block.

12. The processor of claim 10, wherein the plurality of coherency states further indicate whether the first data block has been sent to at least one of the plurality of PUs by an intervention operation.

13. The processor of claim 10, wherein the plurality of coherency states further indicate the first PU received the first data block from a second cache of a second PU.

14. The processor of claim 10, further comprising computer code for assigning a second coherency state to the first data block based on snooping an interconnect coupling the first PU to at least one other of the plurality of PUs.

15. The processor of claim 10, further comprising computer code for assigning a second coherency state to the first data block based on the first PU accessing the first data block.

16. A hardware system, comprising:
    a system memory;
    a plurality of processing units (PUs) coupled to the system memory, each PU further coupled to at least one other of the plurality of PUs;
    wherein each PU comprises a cache;
    wherein each PU is configured to:
       receive a first data block for storage in a first cache of the first PU;
       store the first data block in the first cache; and
       assign a first coherency state and a first tag to the first data block;
    wherein the first coherency state is one of a plurality of coherency states that indicate whether the first PU has accessed the first data block; and wherein the plurality of coherency states further indicate whether, in the event the first PU has not accessed the first data block, the first PU received the first data block from a neighboring PU.

17. The system of claim 16, wherein each PU further comprises a state register configured to hold the first coherency state.

18. The system of claim 16, wherein the plurality of coherency states further indicate:

whether the first data block contains modified data;

whether the first data block is invalid; and whether any other PU of the plurality of PUs also has a copy of the first data block.

19. The system of claim 16, wherein at least the first PU is further configured to assign a second coherency state to the first data block based on snooping an interconnect coupling the first PU to at least one other of the plurality of PUs.

20. The system of claim 16, wherein at least the first PU is further configured to assign a second coherency state to the first data block based on the first PU accessing the first data block.

* * * * *